United States Patent
Nakatsu et al.

(10) Patent No.: US 11,692,861 B2
(45) Date of Patent: Jul. 4, 2023

(54) LIQUID SENSOR AND METHOD FOR MANUFACTURING OPTICAL WAVEGUIDE

(71) Applicant: NIPPON PILLAR PACKING CO., LTD., Osaka (JP)

(72) Inventors: Akira Nakatsu, Osaka (JP); Kentaro Watanabe, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 17/514,731

(22) Filed: Oct. 29, 2021

(65) Prior Publication Data

US 2022/0155128 A1   May 19, 2022

(30) Foreign Application Priority Data

Nov. 13, 2020 (JP) ................................ 2020-189372

(51) Int. Cl.
*G01F 23/26* (2022.01)
*G01F 23/263* (2022.01)
*G01N 27/22* (2006.01)

(52) U.S. Cl.
CPC ......... *G01F 23/268* (2013.01); *G01N 27/226* (2013.01); *G01N 27/223* (2013.01)

(58) Field of Classification Search
CPC ............... G01F 23/268; G01N 27/226; G01N 2021/8514; G01N 2021/8528; G01N 21/8507; G01N 21/59
See application file for complete search history.

(56) References Cited

U.S. PATENT DOCUMENTS

| 4,725,148 A * | 2/1988 | Endo ................. G01N 21/8507 356/442 |
| 10,928,303 B2 * | 2/2021 | Deguchi ................ G01N 21/59 |
| 2010/0214556 A1 * | 8/2010 | Mannhardt ........ G01N 21/8507 356/73 |
| 2013/0166242 A1 * | 6/2013 | Ido ....................... G01N 21/274 73/1.02 |
| 2019/0049370 A1 * | 2/2019 | Mizuuchi ............... G01N 21/09 |

FOREIGN PATENT DOCUMENTS

JP    5-273121 A    10/1993

* cited by examiner

*Primary Examiner* — Francis C Gray
(74) *Attorney, Agent, or Firm* — Birch, Stewart, Kolasch & Birch, LLP

(57) ABSTRACT

Provided is a liquid sensor or the like that is relatively easy to manufacture. The liquid sensor includes a light emitting element, an optical waveguide, a light receiving element, and a detection circuit. The optical waveguide includes a first pillar portion, a first metal plate, a second pillar portion, and a second metal plate. The first metal plate is embedded in the first pillar portion. The second pillar portion is provided at a position opposing the first pillar portion. The second metal plate is embedded in the second pillar portion. A space for liquid is formed between the first pillar portion and the second pillar portion. The first pillar portion includes a first end surface that faces the light emitting element. The first metal plate includes a first reflecting portion that is tilted relative to the first end surface and reflects light toward the second pillar portion. The second pillar portion includes a second end surface that faces the light receiving element. The second metal plate includes a second reflecting portion that is tilted relative to the second end surface and reflects the light from the first metal plate toward the light receiving element.

6 Claims, 13 Drawing Sheets

LIQUID SENSOR AND METHOD FOR MANUFACTURING OPTICAL WAVEGUIDE

CROSS REFERENCE TO RELATED APPLICATIONS

This application claims priority to Japanese Patent Application No. 2020-189372 filed on Nov. 13, 2020, the entire contents of which are incorporated herein by reference.

TECHNICAL FIELD

The present invention relates to a liquid sensor and a method for manufacturing an optical waveguide.

BACKGROUND ART

JP H5-273121A (Patent Document 1) discloses a liquid sensor. In this liquid sensor, light emitted by a light emitting element passes through a liquid, and the light that passes through the liquid is detected by a light receiving element. In this liquid sensor, contamination of the liquid is determined based on the detection result (see Patent Document 1).

JP H5-273121A is an example of related art.

SUMMARY OF THE INVENTION

An object of the present invention is to provide a liquid sensor or the like that is relatively easy to manufacture.

A liquid sensor according to an aspect of the present invention is configured to detect a state of a liquid. The liquid sensor includes a light emitting element, an optical waveguide, a light receiving element, and a detection circuit. The light receiving element is configured to receive light that was emitted by the light emitting element and passed through the optical waveguide. The detection circuit is configured to detect output of the light receiving element. The optical waveguide includes a first pillar portion, a first metal plate, a second pillar portion, and a second metal plate. The first metal plate is embedded in the first pillar portion. The second pillar portion is provided at a position opposing the first pillar portion. The second metal plate is embedded in the second pillar portion. A space for the liquid is formed between the first pillar portion and the second pillar portion. The first pillar portion includes a first end surface that faces the light emitting element. The first metal plate includes a first reflecting portion that is tilted relative to the first end surface and is configured to reflect the light toward the second pillar portion. The second pillar portion includes a second end surface that faces the light receiving element. The second metal plate includes a second reflecting portion that is tilted relative to the second end surface and is configured to reflect the light from the first metal plate toward the light receiving element.

In the optical waveguide included in this liquid sensor, a metal plate that functions as a reflecting portion is embedded in each of the first pillar portion and the second pillar portion. Therefore, according to this liquid sensor, in the case where the optical waveguide is manufactured by molding for example, the optical waveguide and the reflecting portions can be formed at the same time by performing insert molding with use of the metal plate. As a result, the liquid sensor can be manufactured relatively easily.

In the liquid sensor, a configuration is possible in which the first metal plate further includes a first side wall portion that extends along a first side surface of the first pillar portion, and the first side surface is a side surface of the first pillar portion that opposes a second side surface of the first pillar portion that faces the second pillar portion.

According to this liquid sensor, the first metal plate includes the first side wall portion, thus suppressing the amount of light that leaks from the first side surface and making it possible to more accurately detect the state of the liquid.

In the liquid sensor, a configuration is possible in which the optical waveguide includes a connection portion that connects the first pillar portion and the second pillar portion, and the first metal plate further includes a second side wall portion that extends along the second side surface in a boundary portion between the first pillar portion and the connection portion.

According to this liquid sensor, the second side wall portion is provided in the boundary portion between the first pillar portion and the connection portion, thus suppressing the amount of light that leaks toward the connection portion and making it possible to more accurately detect the state of the liquid.

In the liquid sensor, a configuration is possible in which the second side wall portion extends along the second side surface in a range opposing the first side wall portion.

According to this liquid sensor, the first metal plate includes the first side wall portion, thus suppressing the amount of light that leaks from the second side surface and making it possible to more accurately detect the state of the liquid.

In the liquid sensor, a configuration is possible in which the second metal plate further includes a third side wall portion that extends along a third side surface of the second pillar portion, and the third side surface is a side surface of the second pillar portion that opposes a fourth side surface of the second pillar portion that faces the first pillar portion.

According to this liquid sensor, the second metal plate includes the third side wall portion, thus suppressing the amount of light that leaks from the third side surface and making it possible to more accurately detect the state of the liquid.

A method for manufacturing an optical waveguide according to another aspect of the present invention is a method for manufacturing an optical waveguide for use in a liquid sensor that detects a state of a liquid. This manufacturing method includes a step of preparing a mold for the optical waveguide. The mold includes a first groove portion and a second groove portion that opposes the first groove portion. The first groove portion and the second groove portion are separated by a predetermined distance. The manufacturing method further includes the steps of: arranging a metal plate that is bent at two points at a position spanning the first groove portion and the second groove portion; filling the first groove portion and the second groove portion with a material that is to form the optical waveguide; allowing the material to cure; and cutting away a portion of the metal plate that is exposed from the material.

According to this method for manufacturing an optical waveguide, the metal plate is insert-molded when molding the optical waveguide, and therefore the optical waveguide and the reflecting portions can be formed at the same time. Also, according to this method for manufacturing an optical waveguide, one metal plate is arranged at a position spanning the first groove portion and the second groove portion, and then an unnecessary portion of the metal plate is cut away, and therefore only one insert part (metal plate) is needed. As a result, according to this method for manufacturing an optical waveguide, the manufacturing cost of the optical waveguide can be reduced.

According to the present invention, it is possible to provide a liquid sensor or the like that is relatively easy to manufacture.

EMBODIMENTS OF THE INVENTION

Figure 1:
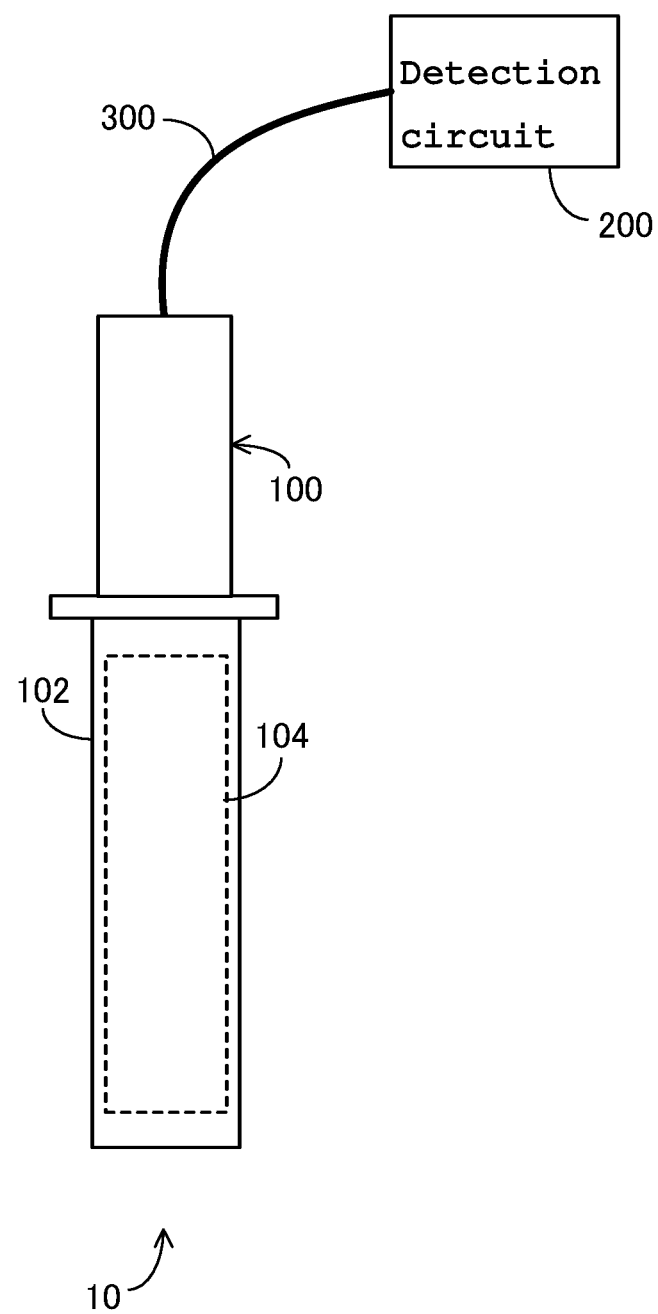
FIG. 1 is a diagram schematically showing a configuration of a liquid sensor.

Hereinafter, an embodiment of the present invention will be described in detail with reference to the drawings. Note that the same or corresponding parts in the drawings are denoted by the same reference numerals, and redundant descriptions will not be given for such parts.

1. Overall Configuration of Liquid Sensor

FIG. 1 is a diagram schematically showing the configuration of a liquid sensor 10 according to the present embodiment. The liquid sensor 10 is mounted in the oil tank of a vehicle or the like, and is configured to optically detect the liquid quality of fuel (oil). Specifically, the liquid sensor 10 is configured to detect the liquid quality of fuel while being at least partially immersed in the fuel.

As shown in FIG. 1, the liquid sensor 10 includes a liquid sensor body 100, a detection circuit 200, and a cable 300. The liquid quality detection unit 104 is housed in a tubular plug 102 of the liquid sensor body 100. Although described in detail later, in the liquid quality detection unit 104, light is emitted toward the fuel, and light that has passed through the fuel is received. In the liquid sensor 10, the liquid quality of the fuel is detected based on the amount of light that has passed through the fuel. Hereinafter, the liquid quality detection unit 104 will be described in detail.

2. Configuration of Liquid Quality Detection Unit

Figure 2:
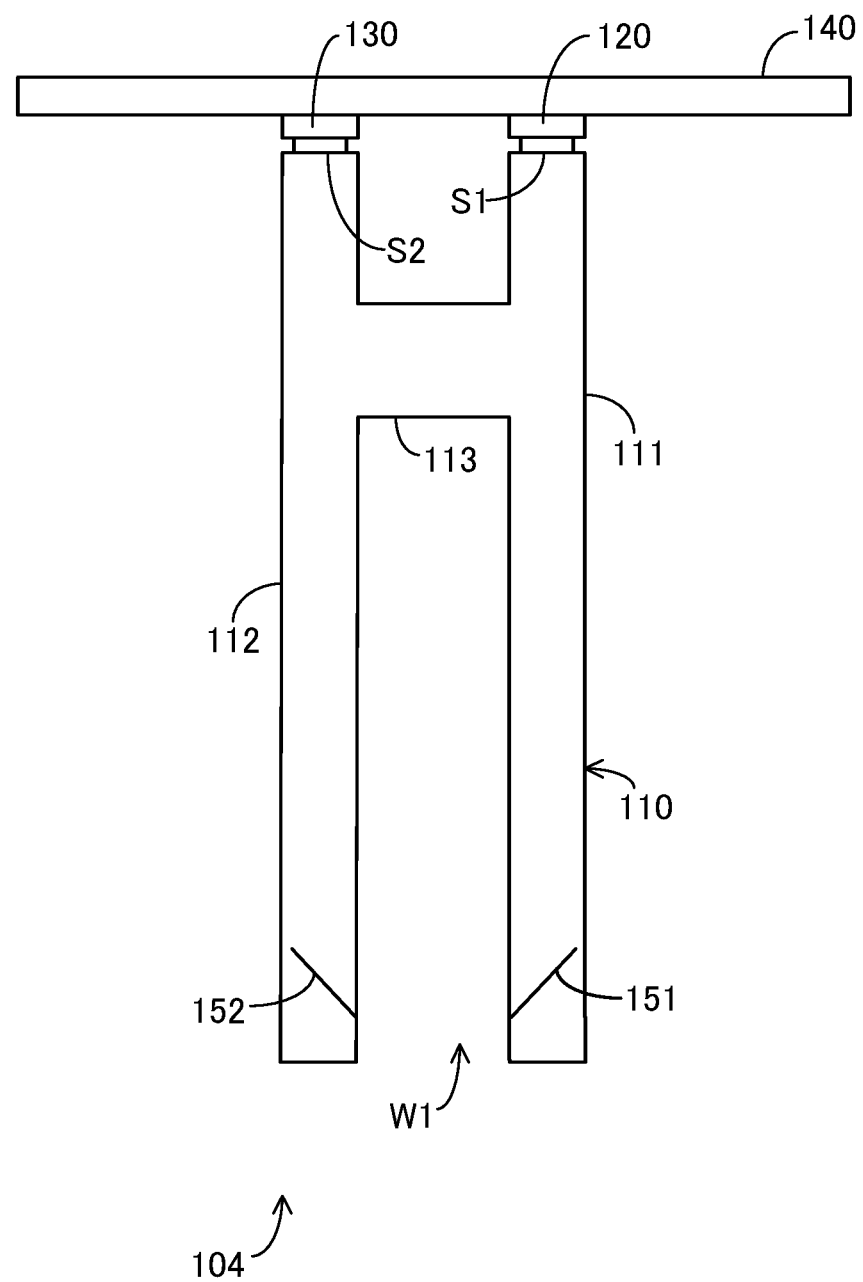
FIG. 2 is a diagram schematically showing a configuration of a liquid quality detection unit.

FIG. 2 is a diagram schematically showing the configuration of the liquid quality detection unit 104. As shown in FIG. 2, the liquid quality detection unit 104 includes an optical waveguide 110, a light emitting element 120, a light receiving element 130, and a conversion board 140.

The optical waveguide 110 is made of a material that allows light to pass through. For example, the optical waveguide 110 is made of a transparent resin such as polycarbonate. The optical waveguide 110 includes a first pillar portion 111, a second pillar portion 112, and a connection portion 113.

The first pillar portion 111 and the second pillar portion 112 are both shaped as a straight rectangular column. One side surface of the first pillar portion 111 that extends in the lengthwise direction faces one side surface of the second pillar portion 112 that extends in the lengthwise direction. A space W1 is formed between the first pillar portion 111 and the second pillar portion 112. In other words, the first pillar portion 111 and the second pillar portion 112 are separated by a predetermined distance. The connection portion 113 is a plate-shaped portion that extends between the first pillar portion 111 and the second pillar portion 112. The first pillar portion 111 and the second pillar portion 112 are connected by the connection portion 113. Because the first pillar portion 111 and the second pillar portion 112 are connected by the connection portion 113, the relative positional relationship between the first pillar portion 111 and the second pillar portion 112 is not likely to shift.

A first end surface S1 is formed at one lengthwise end portion of the first pillar portion 111. The first end surface S1 faces the light emitting element 120. A first metal plate that forms a first reflecting portion 151 is embedded in the first pillar portion 111 at a position near the other lengthwise end portion. The first reflecting portion 151 is made of a metal such as aluminum, copper, or stainless steel.

Also, a second end surface S2 is formed at one lengthwise end portion of the second pillar portion 112. The second end surface S2 faces the light receiving element 130. A second metal plate that forms a second reflecting portion 152 is embedded in the second pillar portion 112 at a position near the other lengthwise end portion. The second reflecting portion 152 is made of a metal such as aluminum, copper, or stainless steel.

Figure 3:
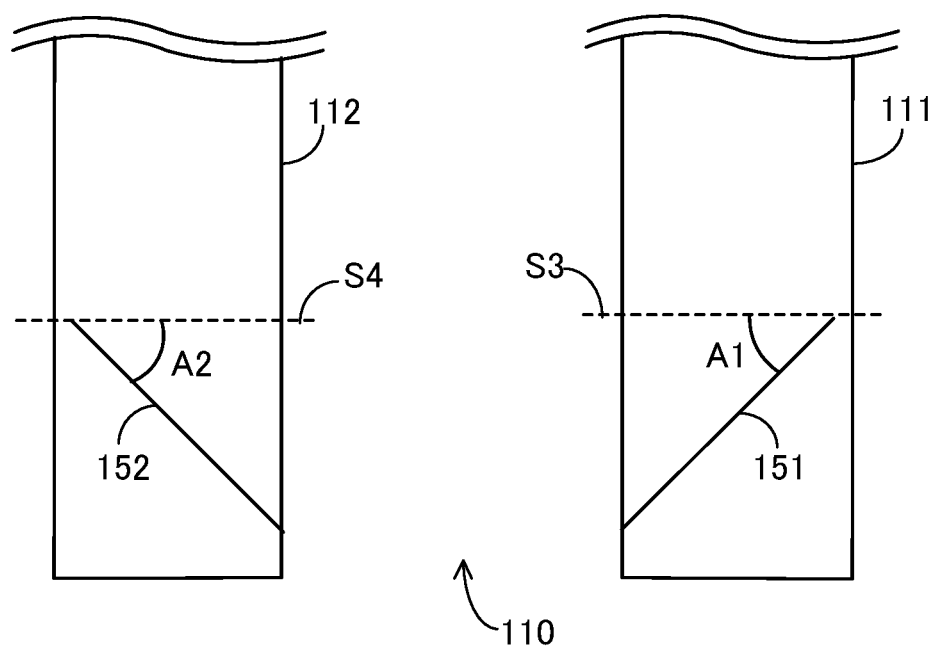
FIG. 3 is a diagram schematically showing leading end portions of an optical waveguide.

FIG. 3 is a diagram schematically showing leading end portions of the optical waveguide 110. As shown in FIG. 3, a surface S3 is a virtual surface that is parallel to the first end surface S1 (FIG. 2) of the first pillar portion 111, and a surface S4 is a virtual surface that is parallel to the second end surface S2 of the second pillar portion 112 (FIG. 2). The first reflecting portion 151 is tilted at an angle A1 relative to the surface S3. In other words, the first reflecting portion 151 is tilted at the angle A1 relative to the first end surface S1. Also, the second reflecting portion 152 is tilted at an angle A2 relative to the surface S4. In other words, the second reflecting portion 152 is tilted at the angle A2 relative to the second end surface S2. The angles A1 and A2 are each approximately 45°.

Returning to FIG. 2, the light emitting element 120 is constituted by an LED (Light Emitting Diode) or a semiconductor laser, for example. The light emitting element 120 is configured to emit light in accordance with an instruction from the detection circuit 200 (FIG. 1). The light emitting element 120 is mounted on the conversion board 140. For example, the detection circuit 200 applies a constant voltage to the light emitting element 120 to cause the light emitting element 120 to emit light with a constant light quantity. The detection circuit 200 causes the light emitting element 120 to emit light at a required timing.

The light receiving element 130 is constituted by a photoresistor, a photodiode, or a photoconductive cell, for example. The light receiving element 130 is configured to receive light that was emitted by the light emitting element 120 and has passed through the optical waveguide 110 and the space W1. The light receiving element 130 is mounted on the conversion board 140.

The conversion board 140 is configured to convert the output of the light receiving element 130 into a voltage. In the conversion board 140, a voltage that corresponds to the amount of light received by the light receiving element 130 is output. The output line of the conversion board 140 and the input line for input to the light emitting element 120 are electrically connected to the detection circuit 200 via the cable 300.

Figure 4:
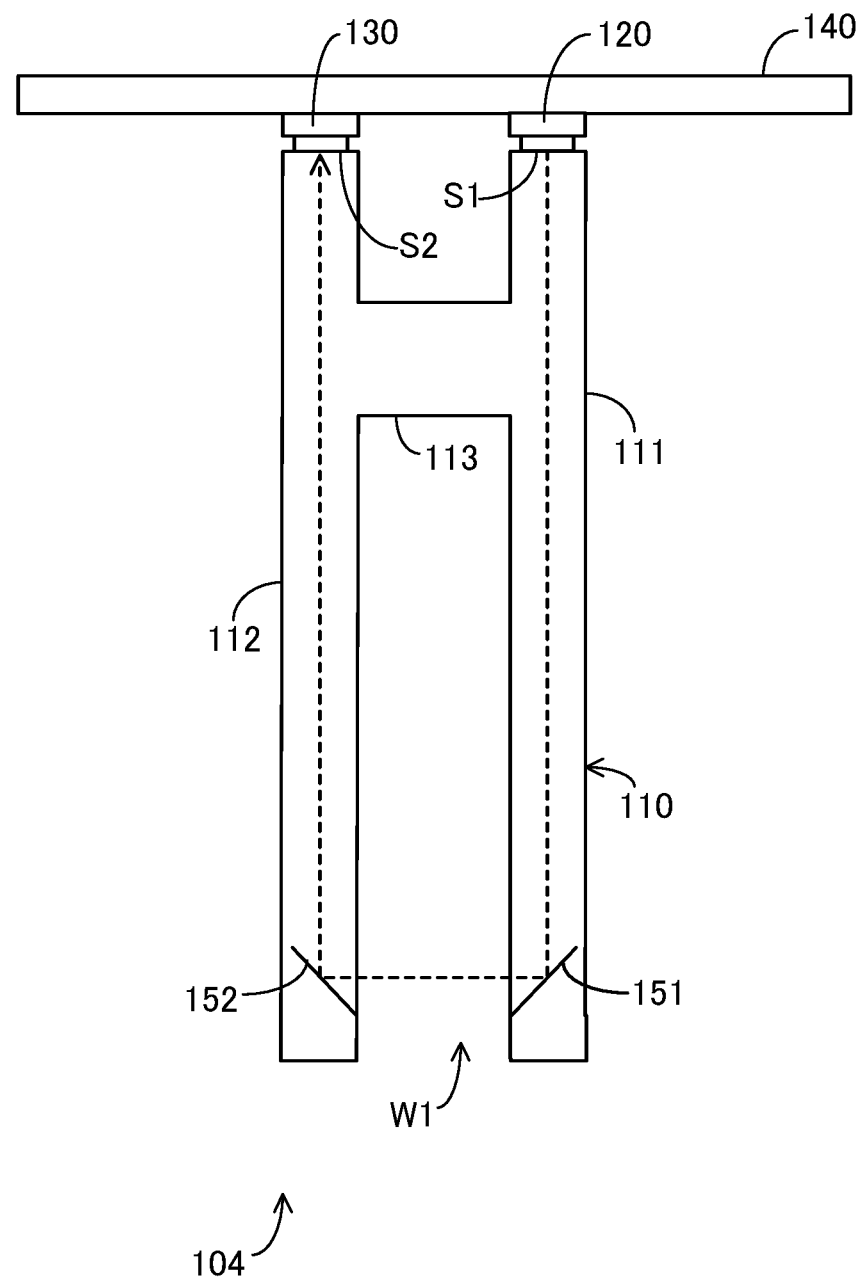
FIG. 4 is a diagram for describing an example of a path of light passing through the optical waveguide.

FIG. 4 is a diagram for describing an example of the path of light passing through the optical waveguide 110. As shown in FIG. 4, when the liquid sensor 10 is to be used, the liquid quality detection unit 104 is first immersed in fuel. When the liquid quality detection unit 104 is immersed in the fuel, fuel is present in the space W1.

Light emitted by the light emitting element 120 enters the first end surface S1 perpendicularly, for example. The light that has entered the first end surface S1 travels through the first pillar portion 111 and is reflected toward the second pillar portion 112 by the first reflecting portion 151. The light reflected by the first reflecting portion 151 passes through the fuel in the space W1 and enters the second pillar portion 112. The light that has entered the second pillar portion 112 is reflected by the second reflecting portion 152. The light reflected by the second reflecting portion 152 travels through the second pillar portion 112, enters the surface S3, and is received by the light receiving element 130.

If the liquid quality of the fuel in the space W1 is good (high transparency), the intensity of the light received by the light receiving element 130 is strong. On the other hand, if the liquid quality of the fuel existing in the space W1 is poor (low transparency), the intensity of the light received by the light receiving element 130 is weak. The detection circuit 200 stores a relationship between the amount of light received by the light receiving element 130 and the liquid quality of the fuel in advance, and detects the liquid quality of the fuel based on the amount of light received by the light receiving element 130.

In the liquid sensor 10 of the present embodiment, the first pillar portion 111 and the second pillar portion 112 each extend straight and do not have a bent structure. Accordingly, the leakage of light traveling through the first pillar portion 111 and the second pillar portion 112 is suppressed compared with the case where the pillar portions have a bent structure, for example. Therefore, according to the liquid sensor 10, the leakage of light to the outside of the optical waveguide 110 is relatively suppressed, and thus the state of the liquid (e.g., liquid quality) can be detected with higher accuracy.

3. Detection Operation

Figure 5:
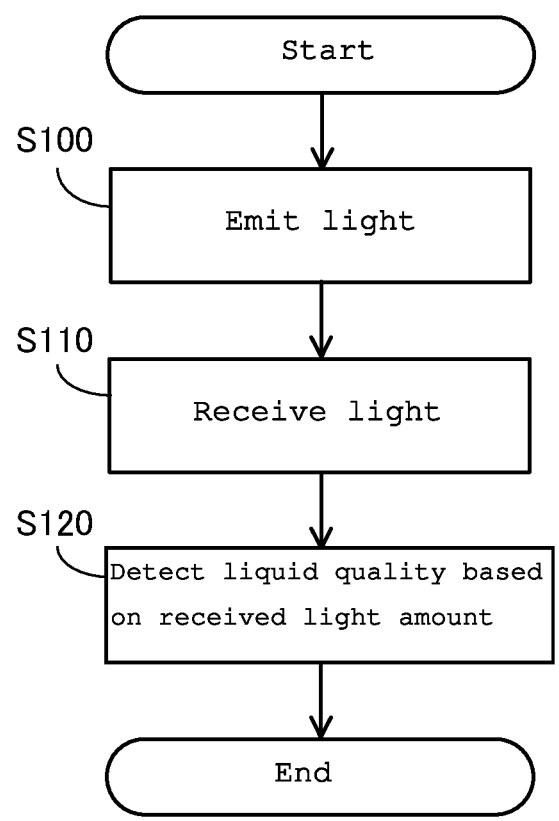
FIG. 5 is a flowchart showing a liquid quality detection procedure of the liquid sensor.

FIG. 5 is a flowchart showing a liquid quality detection procedure of the liquid sensor 10. As shown in FIG. 5, the detection circuit 200 causes the light emitting element 120 to emit light (step S100). The light receiving element 130 receives the light that has passed through the optical waveguide 110 and the space W1, and the conversion board 140 outputs a voltage that corresponds to the amount of received light to the detection circuit 200 (step S110). The detection circuit 200 detects the liquid quality of the fuel based on the voltage that corresponds to the amount of received light (step S120).

4. Optical Waveguide Manufacturing Procedure

Figure 6:
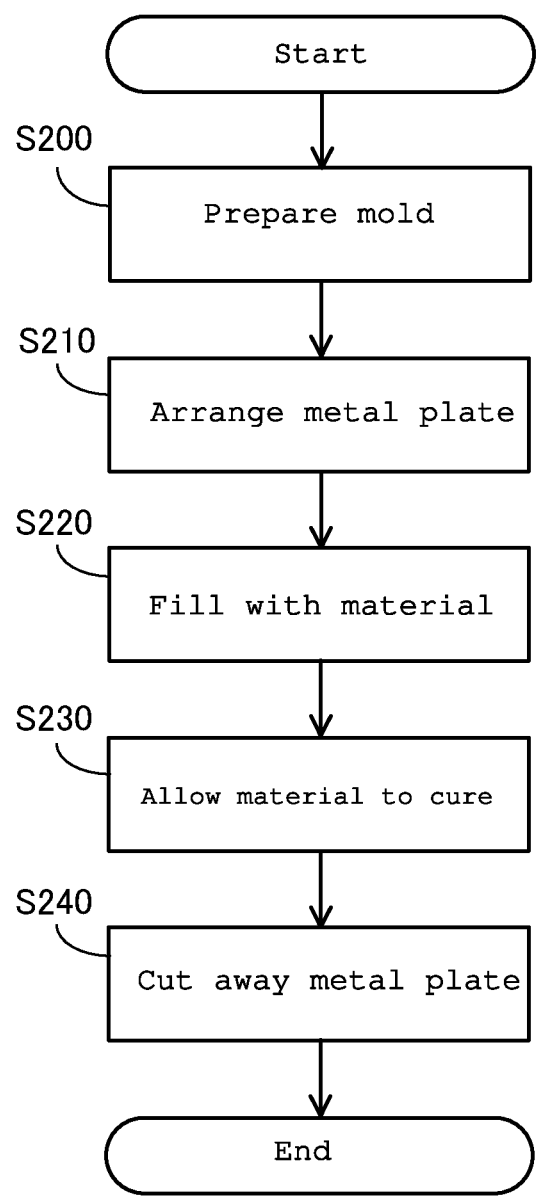
FIG. 6 is a flowchart showing an optical waveguide manufacturing procedure.

FIG. 6 is a flowchart showing a procedure for manufacturing the optical waveguide 110. As shown in FIG. 6, a worker prepares a mold 170 used in the manufacture of the optical waveguide 110 (step S200). The worker places a metal plate 150 on the mold 170 (step S210).

Figure 7:
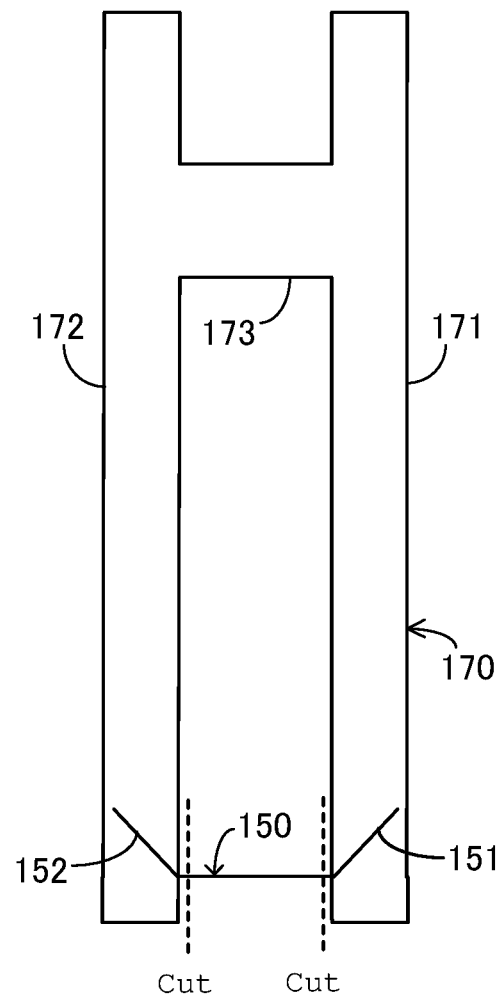
FIG. 7 is a diagram schematically showing a state in which a metal plate is arranged on a mold.

FIG. 7 is a diagram schematically showing a state in which the metal plate 150 is arranged on the mold 170. As shown in FIG. 7, the mold 170 has a shape that corresponds to the optical waveguide 110. Specifically, the mold 170 includes a first groove portion 171 that corresponds to the first pillar portion 111, a second groove portion 172 that corresponds to the second pillar portion 112, and a third groove portion 173 that corresponds to the connection portion 113. The second groove portion 172 opposes the first groove portion 171. The first groove portion 171 and the second groove portion 172 are separated from each other by a predetermined distance. The third groove portion 173 connects the first groove portion 171 and the second groove portion 172. In the mold 170, slits (not shown) are formed at positions where the metal plate 150 passes through. The metal plate 150 is bent at two points. The metal plate 150 is arranged at a position spanning the first groove portion 171 and the second groove portion 172.

Returning to FIG. 6, the worker fills the mold 170, on which the metal plate 150 arranged, with the material that is to form the optical waveguide 110 (e.g., a transparent resin such as polycarbonate) (step S220). The worker allows the material in the mold 170 to cure by, for example, cooling the material (step S230). The worker then cuts the portion of the metal plate 150 that is exposed from the material (step S240). This completes the optical waveguide 110.

5. Features

As described above, in the optical waveguide 110 included in the liquid sensor 10 of the present embodiment, a first metal plate and a second metal plate that respectively function as the first reflecting portion 151 and the second reflecting portion 152 are embedded in the first pillar portion 111 and the second pillar portion 112, respectively. Therefore, according to the liquid sensor 10, in the case where the optical waveguide 110 is manufactured by molding for example, the optical waveguide 110, the first reflecting portion 151, and the second reflecting portion 152 can be formed at the same time by performing insert molding with use of the metal plate 150. As a result, the liquid sensor 10 can be manufactured relatively easily.

6. Variations

Although an embodiment has been described above, the present invention is not limited to the above embodiment, and various variations can be made without departing from the spirit of the embodiment. Variations will be described below.

<6-1>

In the above embodiment, the first metal plate embedded in the first pillar portion 111 includes only the first reflecting portion 151, and the second metal plate embedded in the second pillar portion 112 includes only the second reflecting portion 152. However, the metal plates embedded in the first pillar portion 111 and the second pillar portion 112 may include other portions.

Figure 8:
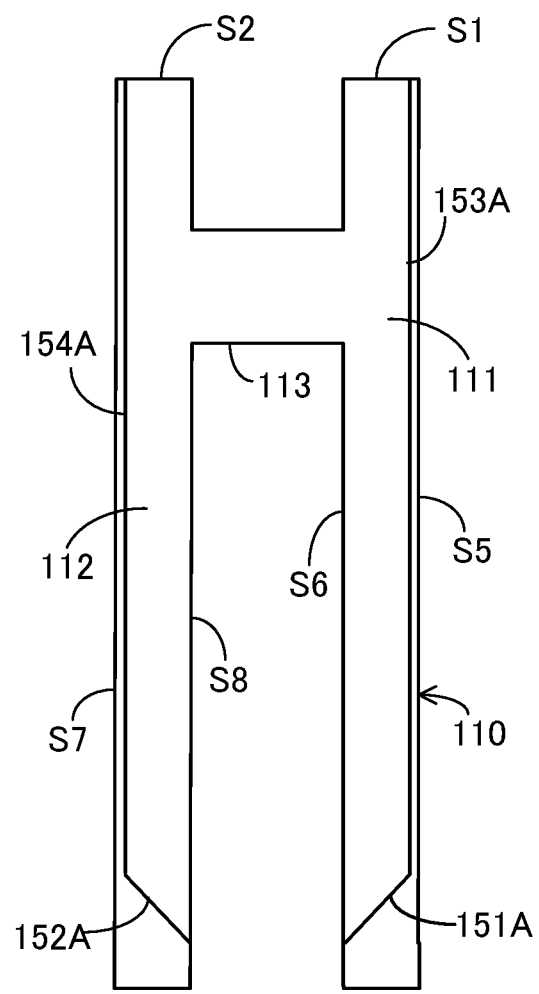
FIG. 8 is a diagram schematically showing an optical waveguide that has embedded metal plates in a first variation.

FIG. 8 is a diagram schematically showing an optical waveguide 110 that has embedded metal plates in a first variation. As shown in FIG. 8, the first metal plate embedded in the first pillar portion 111 includes a first reflecting portion 151A and a first side wall portion 153A, and the second metal plate embedded in the second pillar portion 112 includes a second reflecting portion 152A and a third side wall portion 154A. The first reflecting portion 151A and the first side wall portion 153A are formed as a single body. The angle formed by the first reflecting portion 151A and the first side wall portion 153A is approximately 135°, for example. Also, the second reflecting portion 152A and the third side wall portion 154A are formed as a single body. The angle formed by the second reflecting portion 152A and the third side wall portion 154A is approximately 135°, for example.

The first pillar portion 111 has a first side surface S5 and a second side surface S6 that each extend perpendicular to the first end surface S1. The first side surface S5 and the second side surface S6 oppose each other. The second pillar portion 112 has a third side surface S7 and a fourth side surface S8 that each extend perpendicular to the second end surface S2. The third side surface S7 and the fourth side surface S8 oppose each other. The second side surface S6 and the fourth side surface S8 face each other.

The first side wall portion 153A extends along the first side surface S5. The third side wall portion 154A extends along the third side surface S7.

According to the liquid sensor of the first variation, the first metal plate includes the first side wall portion 153A, thus suppressing the amount of light that leaks from the first side surface S5 and making it possible to more accurately detect the state of the liquid. Also, the second metal plate includes the third side wall portion 154A, thus suppressing the amount of light that leaks from the third side surface S7 and making it possible to more accurately detect the state of the liquid. Note that it is not necessary for both the first metal plate and the second metal plate to include the first side wall portion 153A and the third side wall portion 154A, and a configuration is possible in which only either one of the metal plates has a side wall portion.

<6-2>

In the first variation, the first side wall portion 153A is provided in the first metal plate, and the third side wall portion 154A is provided in the second metal plate. However, the side wall portions or the like provided in the metal plates are not limited to this.

Figure 9:
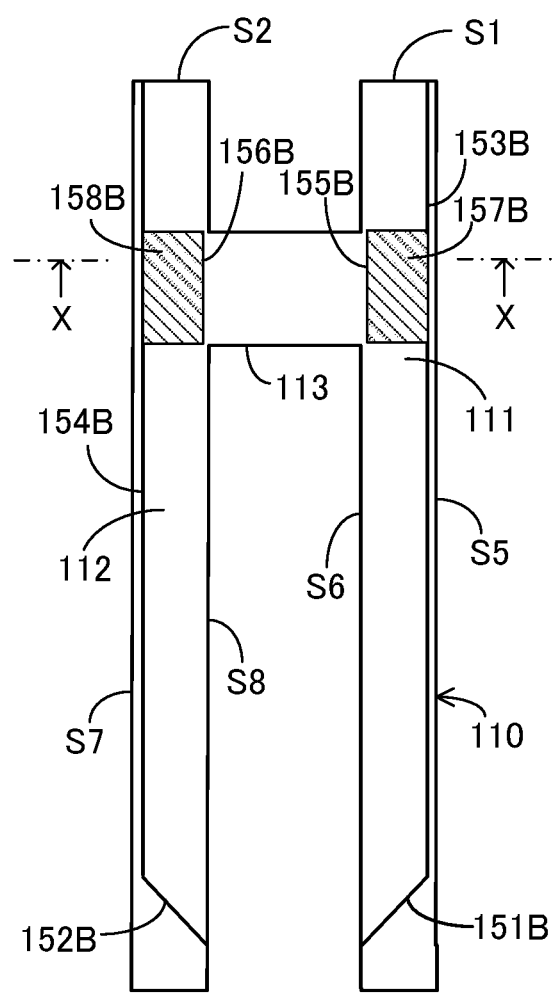
FIG. 9 is a diagram schematically showing an optical waveguide that has embedded metal plates in a second variation.
Figure 10:
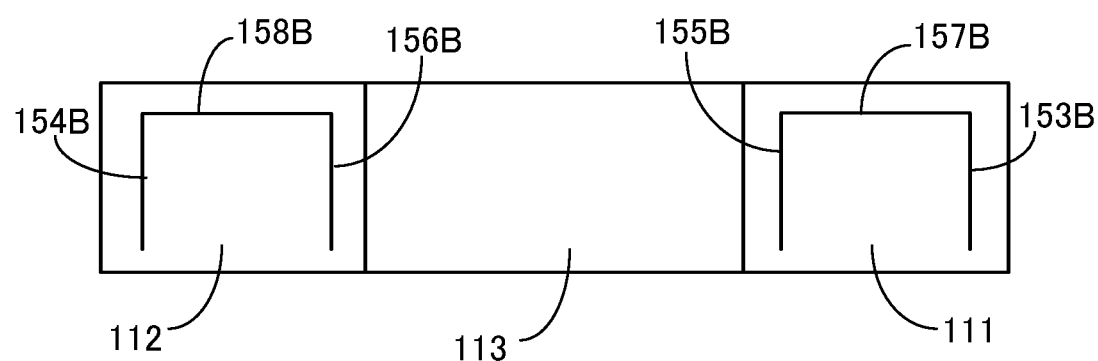
FIG. 10 is a diagram schematically showing a cross-section taken along X-X in FIG. 9.

FIG. 9 is a diagram schematically showing an optical waveguide 110 that has embedded metal plates in a second variation. FIG. 10 is a diagram schematically showing a cross-section taken along X-X in FIG. 9. As shown in FIGS. 9 and 10, the first metal plate embedded in the first pillar portion 111 includes a first reflecting portion 151B, a first side wall portion 153B, a second side wall portion 155B, and an upper surface portion 157B, and the second metal plate embedded in the second pillar portion 112 includes a second reflecting portion 152B, a third side wall portion 154B, a fourth side wall portion 156B, and an upper surface portion 158B.

The second side wall portion 155B extends along the second side surface S6 in the boundary portion between the first pillar portion 111 and the connection portion 113. The second side wall portion 155B opposes the first side wall portion 153B that extends along the first side surface S5. The first side wall portion 153B and the second side wall portion 155B are connected via the upper surface portion 157B.

The fourth side wall portion 156B extends along the fourth side surface S8 in the boundary portion between the second pillar portion 112 and the connection portion 113. The fourth side wall portion 156B opposes the third side wall portion 154B that extends along the third side surface S7. The fourth side wall portion 156B and the third side wall portion 154B are connected via the upper surface portion 158B.

According to the liquid sensor in the second variation, the second side wall portion 155B is provided in the boundary portion between the first pillar portion 111 and the connection portion 113, and the amount of light that leaks from the first pillar portion 111 toward the connection portion 113 is suppressed, thus making it possible to more accurately detect the state of the liquid. Also, the fourth side wall portion 156B is provided in the boundary portion between the second pillar portion 112 and the connection portion 113, and the amount of light that leaks from the second pillar portion 112 toward the connection portion 113 is suppressed, thus making it possible to more accurately detect the state of the liquid. Note that it is not necessary for both the first metal plate and the second metal plate to include the second side wall portion 155B and the fourth side wall portion 156B, and a configuration is possible in which only either one of the metal plates has a side wall portion in the boundary portion between the pillar portion and the connection portion 113.

<6-3>

In the second variation, the second side wall portion 155B and the fourth side wall portion 156B are provided only in the boundary portions between the pillar portions and the connection portion 113. However, the ranges in which the second side wall portion 155B and the fourth side wall portion 156B are provided are not limited to this.

Figure 11:
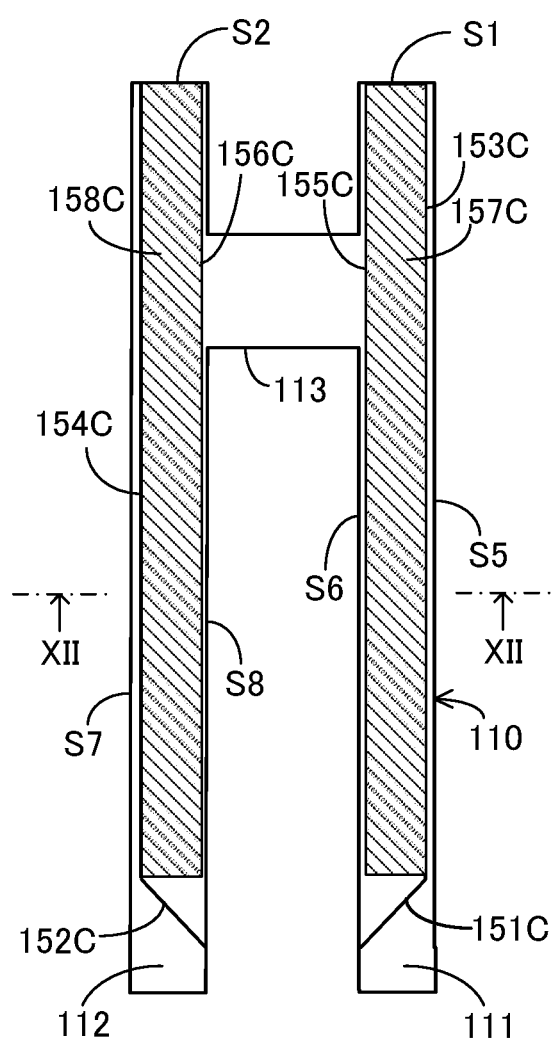
FIG. 11 is a diagram schematically showing an optical waveguide that has embedded metal plates in a third variation.
Figure 12:
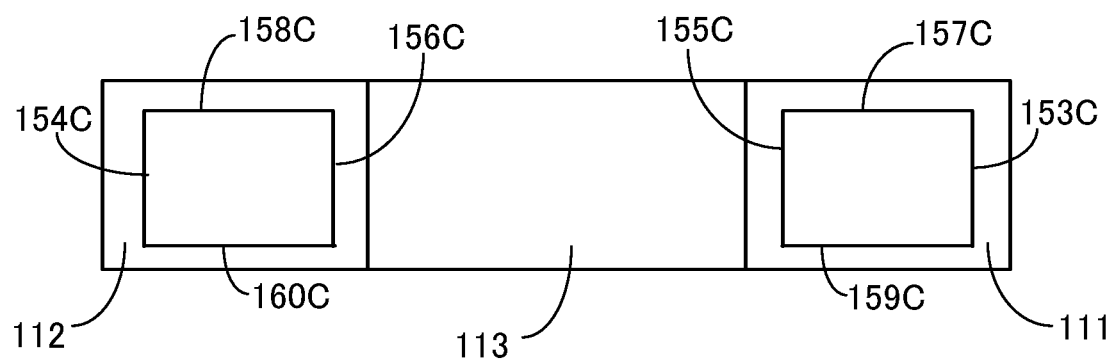
FIG. 12 is a diagram schematically showing a cross-section taken along XII-XII in FIG. 11.

FIG. 11 is a diagram schematically showing an optical waveguide 110 that has embedded metal plates in a third variation. FIG. 12 is a diagram schematically showing a cross-section taken along XII-XII in FIG. 11. As shown in FIGS. 11 and 12, a second side wall portion 155C extends along the second side surface S6 in the range opposing the first side wall portion 153C rather than merely in the boundary portion between the first pillar portion 111 and the connection portion 113. Moreover, an upper surface portion 157C and a lower surface portion 159C, which connect the first side wall portion 153C and the second side wall portion 155C, also extend perpendicular to the first end surface S1 in the range in which the first side wall portion 153C and the second side wall portion 155C extend.

Also, a fourth side wall portion 156C extends along the fourth side surface S8 in the range opposing the third side wall portion 154C rather than merely in the boundary portion between the second pillar portion 112 and the connection portion 113. Moreover, an upper surface portion 158C and a lower surface portion 160C, which connect the fourth side wall portion 156C and the third side wall portion 154C, also extend perpendicular to the second end surface S2 in the range in which the fourth side wall portion 156C and the third side wall portion 154C extend.

According to the liquid sensor in the third variation, the second side wall portion 155C of the first metal plate is formed in most of the range of the second side surface S6, and the amount of light that leaks from the second side surface S6 is suppressed, thus making it possible to more accurately detect the state of the liquid. Also, the fourth side wall portion 156C of the second metal plate is formed in most of the range of the fourth side surface S8, and the amount of light that leaks from the fourth side surface S8 is suppressed, thus making it possible to more accurately detect the state of the liquid. Moreover, because the amount of light that leaks from the upper surface and the lower surface of the first pillar portion 111 and the second pillar portion 112 is also suppressed, it is possible to more accurately detect the state of the liquid.

<6-4>

In the above embodiment, the first pillar portion 111 and the second pillar portion 112 are each shaped as a straight rectangular column. However, the shapes of the first pillar portion 111 and the second pillar portion 112 are not limited to this. For example, the first pillar portion 111 and the second pillar portion 112 may each be provided with a notch cut out in a direction perpendicular to the traveling direction of light.

Figure 13:
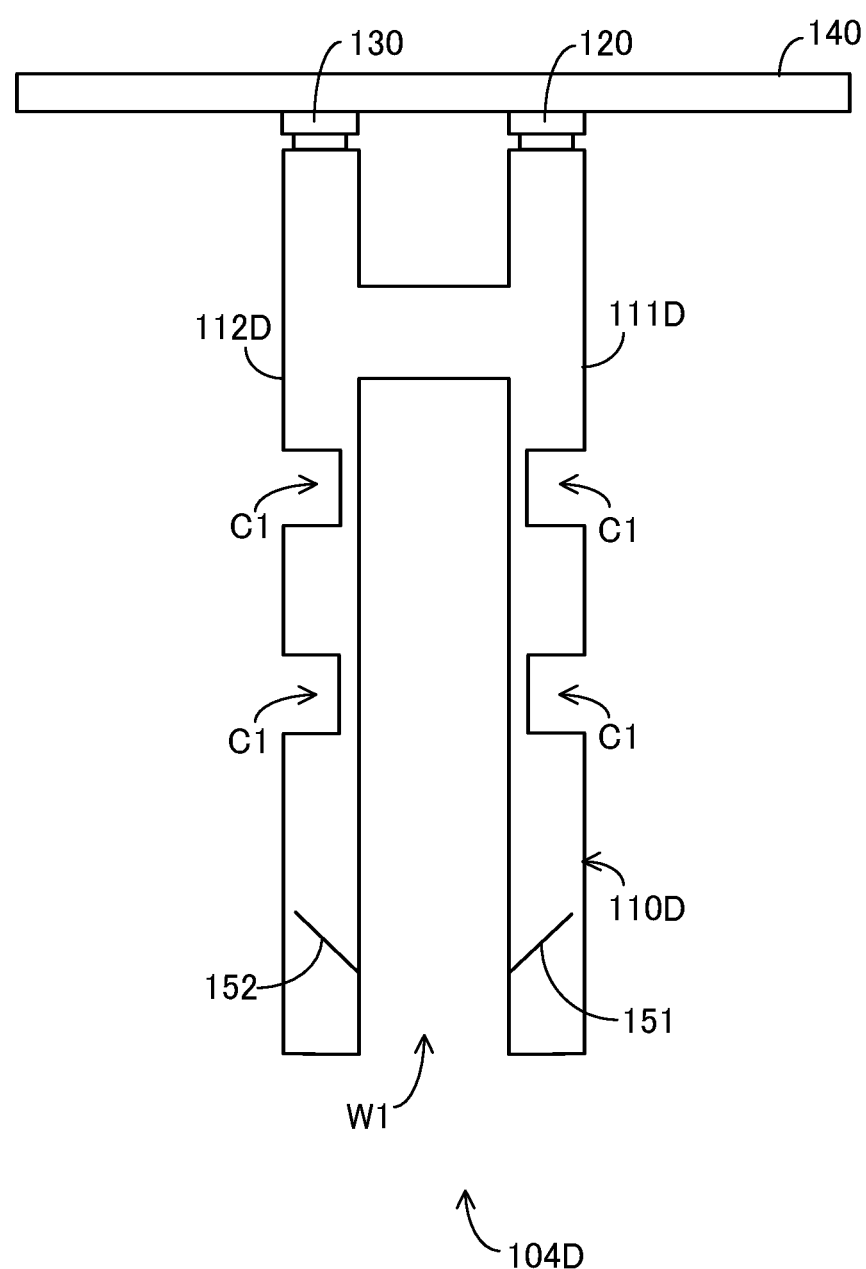
FIG. 13 is a diagram schematically showing an example of the configuration of the liquid quality detection unit in a fourth variation.

FIG. 13 is a diagram schematically showing an example of the configuration of a liquid quality detection unit 104D in a fourth variation. As shown in FIG. 13, in the liquid quality detection unit 104D, a first pillar portion 111D and a second pillar portion 112D are each provided with a plurality of notches C1 formed in a direction perpendicular to the traveling direction of light. In other words, the first pillar portion 111D and the second pillar portion 112D are each provided with a plurality of recessed portions that are recessed in a direction perpendicular to the traveling direction of light.

When the liquid sensor of the fourth variation is to be used, the liquid quality detection unit 104D is first immersed in fuel. In this case, fuel is present in the space W1 and the notches C1. In this liquid sensor, the light emitted by the light emitting element 120 passes through the liquid located in the space W1 and the notches C1. Therefore, according to the liquid sensor of the fourth variation, light can pass through a larger amount of liquid, and the state of the liquid can be more accurately reflected by the amount of light received by the light receiving element 130, thus making it possible to more accurately detect the state of the liquid.

<6-5>

In the above embodiment, the first pillar portion 111 and the second pillar portion 112 are connected by the connection portion 113. However, the first pillar portion 111 and the second pillar portion 112 do not necessarily need to be connected by the connection portion 113. The first pillar portion 111 and the second pillar portion 112 may be independent members.

<6-6>

In the above embodiment, the first reflecting portion 151 is tilted at the angle A1 relative to the first end surface S1, and the second reflecting portion 152 is tilted at the angle A2 relative to the second end surface S2. Also, the angles A1 and A2 are each approximately 45°. However, the angles A1 and A2 do not necessarily need to be approximately 45°. The angles A1 and A2 may be any angle as long as a relationship is established in which the first reflecting portion 151 reflects light toward the second pillar portion 112, and the second reflecting portion 152 reflects light from the first reflecting portion 151 toward the light receiving element 130.

<6-7>

In the above embodiment, a plate-shaped liquid level sensor may be arranged between the first pillar portion 111 and the second pillar portion 112, for example. For example, the liquid level sensor is provided with a hole, and two electrodes are formed at opposite positions in the hole. The remaining amount of fuel is detected based on a change in capacitance detected by applying a voltage between the two electrodes, for example.

<6-8>

In the above embodiment, the liquid sensor 10 or the like is mounted in an oil tank, and the liquid quality of fuel is detected. However, the liquid quality detected by the liquid sensor 10 or the like is not limited to the liquid quality of fuel. The liquid sensor 10 or the like may be mounted in a tank that vibrates during operation, and may detect the liquid quality of water, various aqueous solutions (e.g., an acidic aqueous solution or an alkaline aqueous solution), alcohols, solvents, or oils (e.g., working oil or lubricating oil in a device that vibrates). In other words, it is sufficient that the liquid sensor 10 or the like detects the liquid quality of a liquid while being at least partially immersed in the liquid.

<6-9>

In the above embodiment, the first pillar portion 111 and the second pillar portion 112 are each shaped as a straight rectangular column. However, the shapes of the first pillar portion 111 and the second pillar portion 112 do not necessarily need to be such shapes. The first pillar portion 111 and the second pillar portion 112 may each be shaped as a straight circular column, for example.

LIST OF REFERENCE NUMERALS

10 Liquid sensor
100 Liquid sensor body
102 Plug
104, 104D Liquid quality detection unit
110, 110D Optical waveguide
111, 111D First pillar portion
112, 112D Second pillar portion
113 Connection portion
120 Light emitting element
130 Light receiving element
140 Conversion board
150 Metal plate
151, 151A, 151B, 151C First reflecting portion
152, 152A, 152B, 152C Second reflecting portion
153A, 153B, 153C First side wall portion
154A, 154B, 154C Third side wall portion
155B, 155C Second side wall portion
156B, 156C Fourth side wall portion
157B, 157C, 158B, 158C Upper surface portion
159C, 160C Lower surface portion
170 Mold
171 First groove portion
172 Second groove portion
173 Third groove portion
200 Detection circuit
300 Cable
A1, A2 Angle
C1 Notch
S1 First end surface
S2 Second end surface
S3, S4 Surface
S5 First side surface
S6 Second side surface
S7 Third side surface
S8 Fourth side surface
W1 Space

What is claimed is:

1. A liquid sensor configured to detect a state of a liquid, the liquid sensor comprising:
   a light emitting element;
   an optical waveguide;
   a light receiving element configured to receive light that was emitted by the light emitting element and passed through the optical waveguide; and
   a detection circuit configured to detect output of the light receiving element, wherein the optical waveguide includes:
   a first pillar portion,
   a first metal plate embedded in the first pillar portion,
   a second pillar portion provided at a position opposing the first pillar portion, and
   a second metal plate embedded in the second pillar portion, the first pillar portion includes a first end surface that faces the light emitting element, the first metal plate includes a first reflecting portion that is tilted relative to the first end surface and is configured to reflect the light toward the second pillar portion, the second pillar portion includes a second end surface that faces the light receiving element, the second metal plate includes a second reflecting portion that is tilted relative to the second end surface and is configured to reflect the light from the first metal plate toward the light receiving element, and a space for the liquid is formed between a portion of the first pillar portion in which the first metal plate is embedded and a portion of the second pillar portion in which the second metal plate is embedded.

2. The liquid sensor according to claim 1, wherein the first metal plate further includes a first side wall portion that extends along a first side surface of the first pillar portion, and the first side surface is a side surface of the first pillar portion that opposes a second side surface of the first pillar portion that faces the second pillar portion.

3. The liquid sensor according to claim 2, wherein the optical waveguide includes a connection portion that connects the first pillar portion and the second pillar portion, and the first metal plate further includes a second side wall portion that extends along the second side surface in a boundary portion between the first pillar portion and the connection portion.

4. The liquid sensor according to claim 3, wherein the second side wall portion extends along the second side surface in a range opposing the first side wall portion.

5. The liquid sensor according to claim 1, wherein the second metal plate further includes a side wall portion that extends along a side surface of the second pillar portion and that is opposite a side surface facing the first pillar portion.

6. A method for manufacturing an optical waveguide for use in a liquid sensor that detects a state of a liquid, comprising the step of:

preparing a mold for the optical waveguide, wherein the mold includes a first groove portion and a second groove portion that opposes the first groove portion, the first groove portion and the second groove portion are separated by a predetermined distance, and the method further comprises the steps of:

arranging a metal plate that is bent at two points at a position spanning the first groove portion and the second groove portion;

filling the first groove portion and the second groove portion with a material that is to form the optical waveguide;

allowing the material to cure; and cutting away a portion of the metal plate that is exposed from the material.

* * * * *